F. RAMSTETTER AND W. J. BRITT.
POLISHING MACHINE.
APPLICATION FILED DEC. 13, 1918.

1,356,737.

Patented Oct. 26, 1920.
8 SHEETS—SHEET 1.

Fig. I.

WITNESS.
Charles A. Becker.

INVENTORS.
FRANK RAMSTETTER,
WILLIAM J. BRITT,
BY
Knight + Cook
THEIR ATTORNEYS.

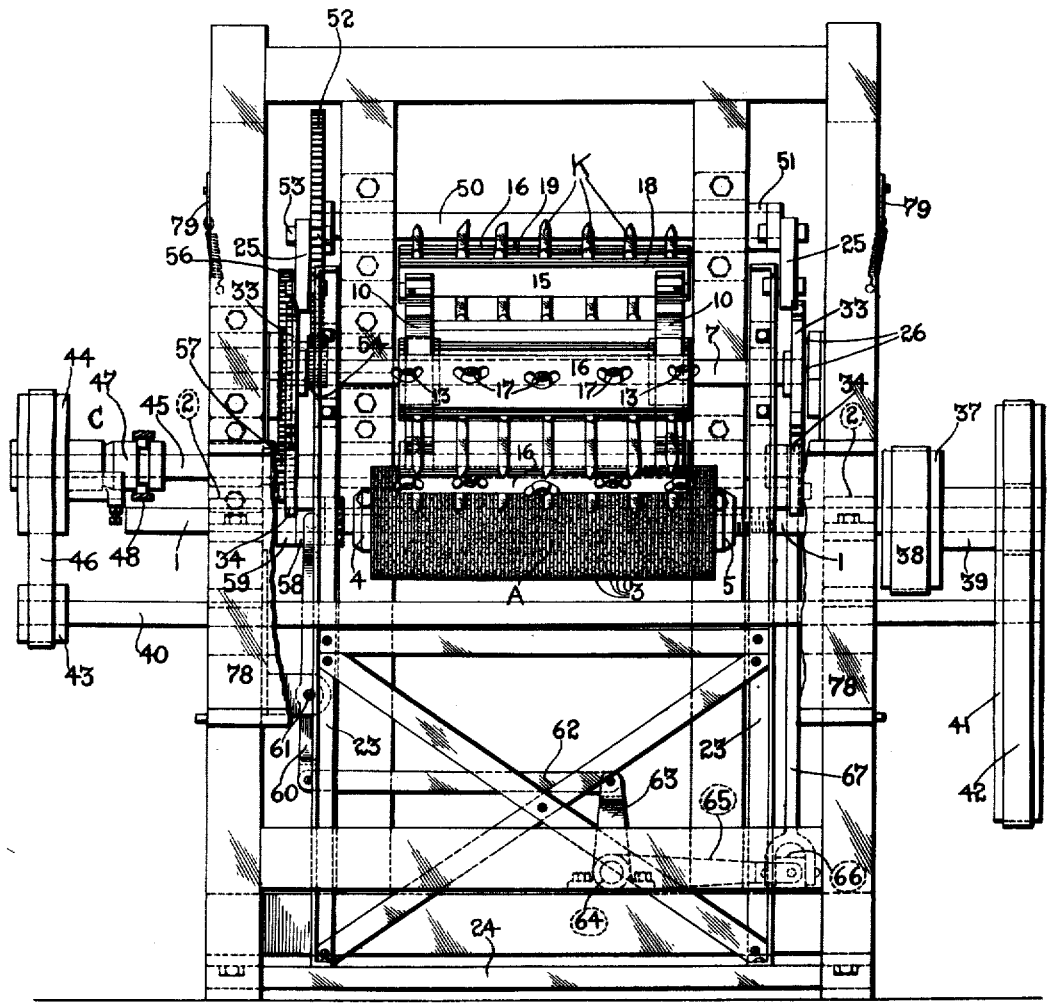

F. RAMSTETTER AND W. J. BRITT.
POLISHING MACHINE.
APPLICATION FILED DEC. 13, 1918.
1,356,737.
Patented Oct. 26, 1920.
8 SHEETS—SHEET 3.
Fig. III.
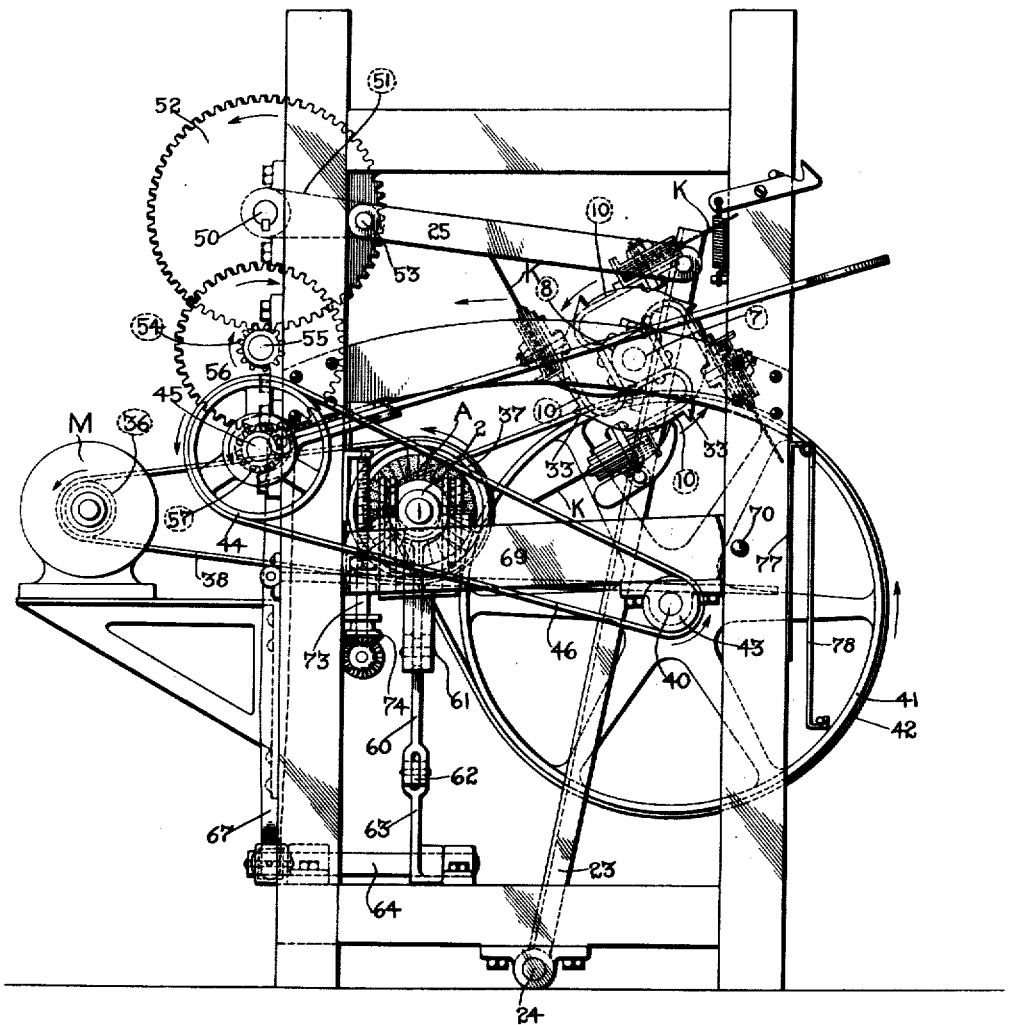
WITNESS.
Charles A. Becker
INVENTORS.
FRANK RAMSTETTER,
WILLIAM J. BRITT,
BY
Knight T Cook
THEIR ATTORNEYS.

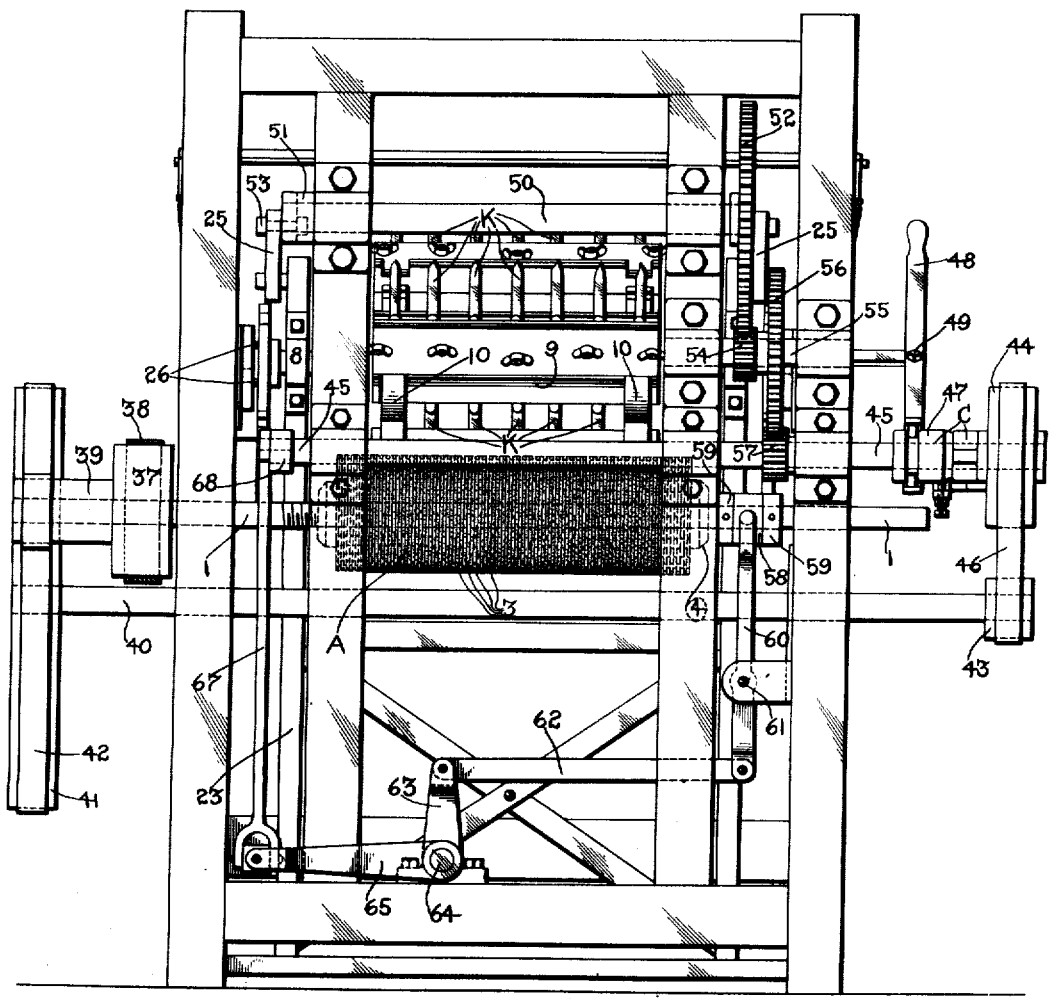

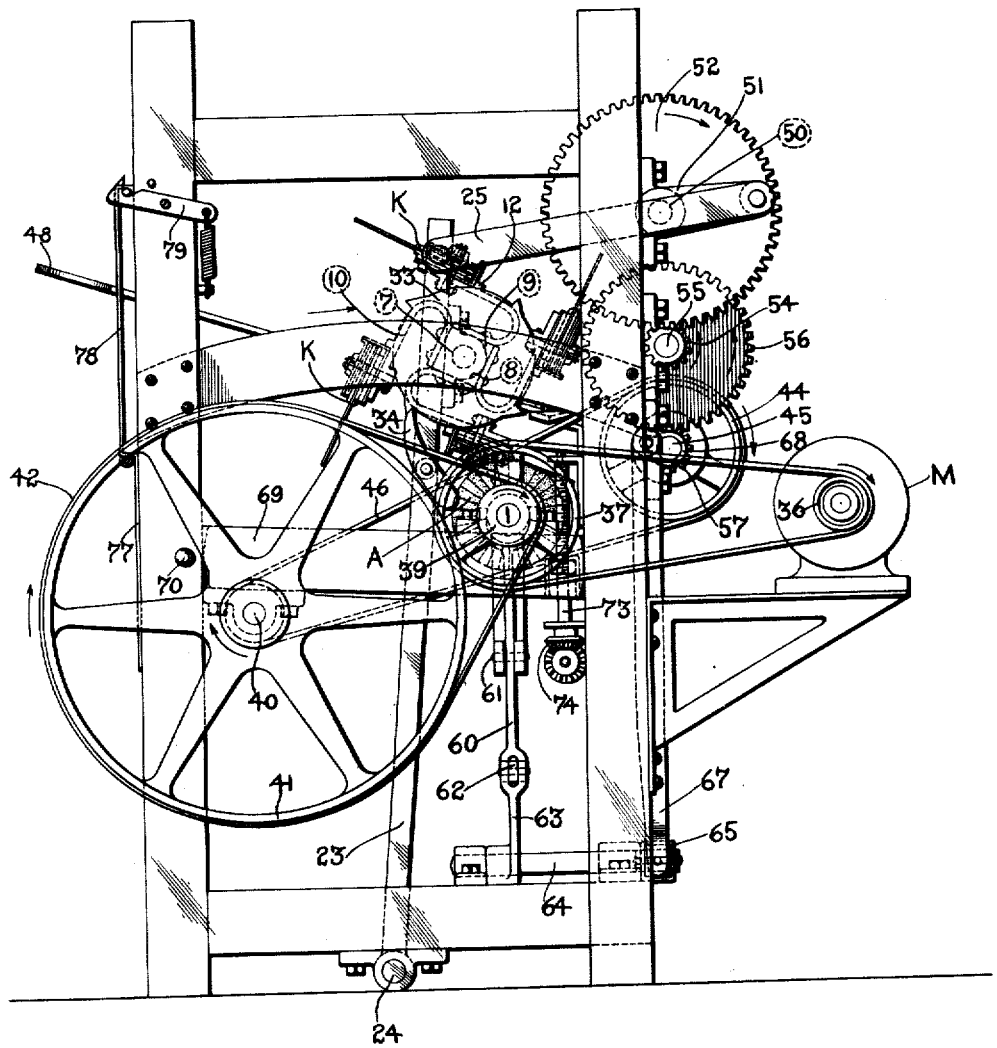

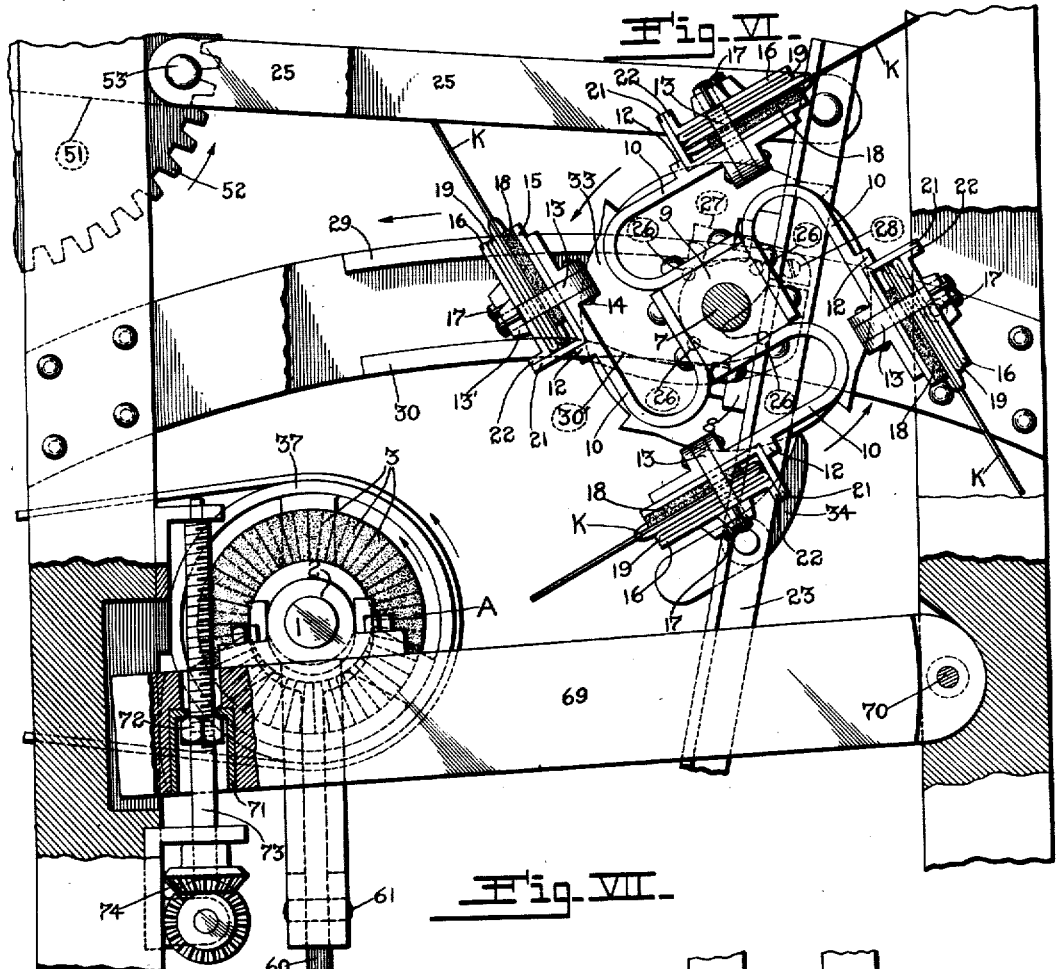
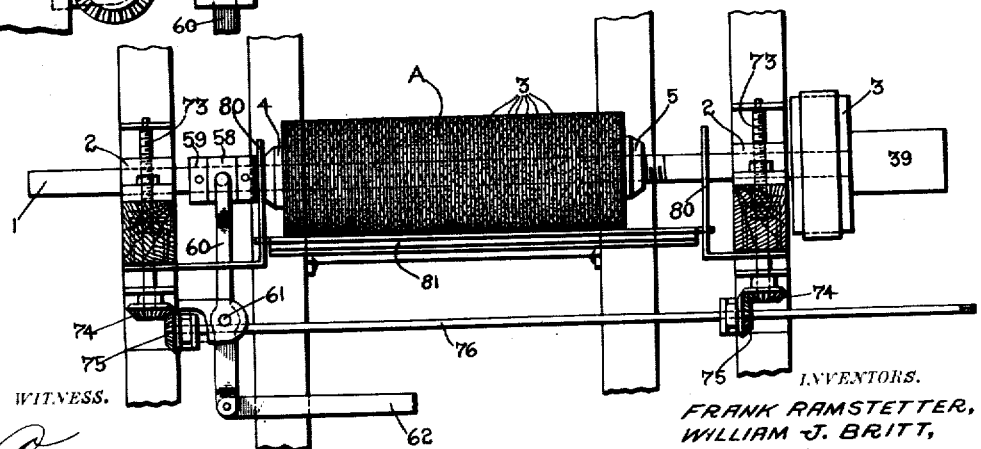

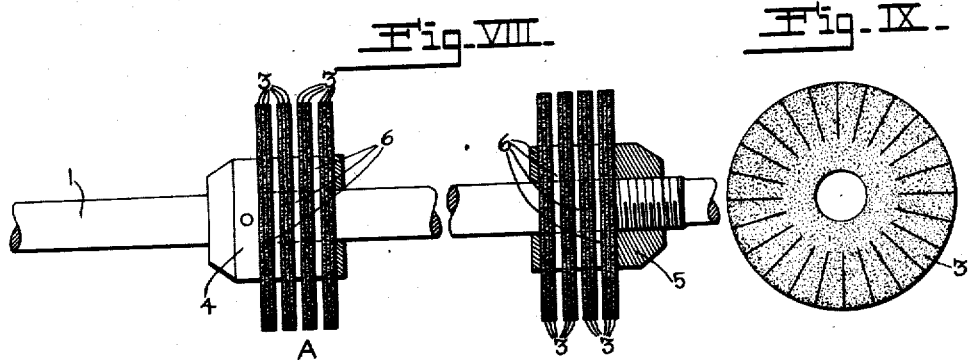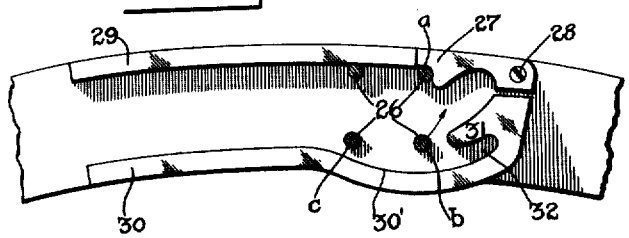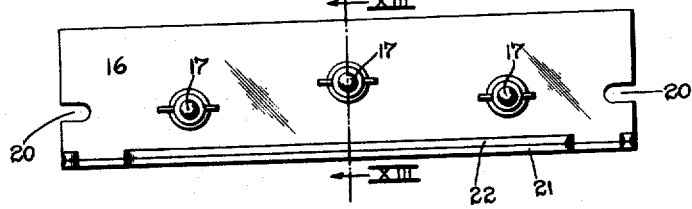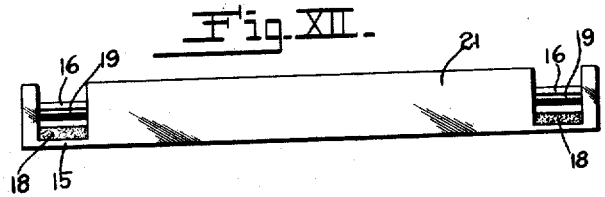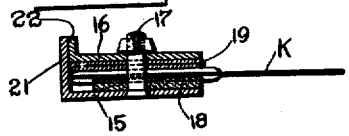

F. RAMSTETTER AND W. J. BRITT.
POLISHING MACHINE.
APPLICATION FILED DEC. 13, 1918.
1,356,737.
Patented Oct. 26, 1920.
8 SHEETS—SHEET 8.
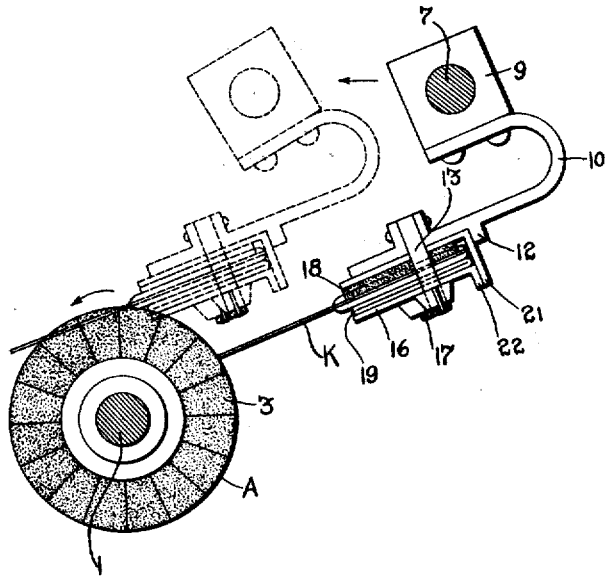
Fig. XIV.
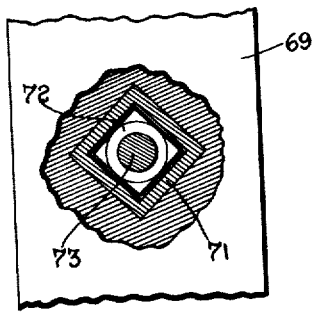
Fig. XV.
WITNESS.
Charles A. Becker.
INVENTORS.
FRANK RAMSTETTER,
WILLIAM J. BRITT,
BY
Knight Cook
THEIR ATTORNEYS.

UNITED STATES PATENT OFFICE.

FRANK RAMSTETTER AND WILLIAM J. BRITT, OF ST. LOUIS, MISSOURI, ASSIGNORS TO SIMMONS HARDWARE COMPANY, OF ST. LOUIS, MISSOURI, A CORPORATION OF MISSOURI.

POLISHING-MACHINE.

1,356,737.   Specification of Letters Patent.   Patented Oct. 26, 1920.

Application filed December 13, 1918. Serial No. 266,630.

*To all whom it may concern:*

Be it known that we, FRANK RAMSTETTER and WILLIAM J. BRITT, citizens of the United States of America, residents of the city of St. Louis, in the State of Missouri, have invented certain new and useful Improvements in Polishing-Machines, of which the following is a full, clear, and exact description, reference being had to the accompanying drawings, forming a part of this specification.

This invention relates to improvements in polishing machines, and more particularly to a machine whereby the polishing element and the articles to be polished are manipulated automatically. The machine we have shown to illustrate the preferred form of the invention is particularly adapted for polishing the blades of pocket knives. It is capable of handling many knives at the same time, and owing to the peculiar manner in which the several coöperating elements are actuated, each blade is uniformly polished throughout its exposed surfaces, and this is accomplished without impairing the temper of the blades. Furthermore, no skill is required on the part of the operator of the machine, and the polishing operation is not injurious to the health of the operator.

The main object of the present invention is to produce a combination of coöperating machine elements serving as a highly efficient substitute for many skilled operators, the machine herein disclosed being adapted to be placed under the control of a single unskilled operator. Instead of polishing only one knife at a time, a group of knives are automatically manipulated at the same time, and each individual knife is most effectively subjected to the desired polishing operation.

The preferred form of the invention comprises a rotary polishing roll having a flexible or yielding polishing face, and a knife holder whereby groups of knives are held during the polishing operations. Either the polishing roll or the knife holder should be movable, so that one will move toward the other for the purpose of placing the blades in contact with the polishing roll, and this movement should be continued for the purpose of polishing each blade throughout its length. To avoid the production of streaks on the highly polished blades, i. e., to give each blade a uniform polish, either the polishing roll or the knife blades should also move longitudinally of the roll. By moving the blades transversely of the rotary polishing roll and at the same time imparting a longitudinal movement to the roll, each blade is exposed to various peripheral portions of the rotating roll, and the blades are not liable to be streaked by a constantly repeated engagement with an irregular portion of the roll. The desired relative movements are preferably obtained by moving the knife holder toward and away from the rotating polishing roll, thereby moving the knife blades transversely of the roll with which they are engaged, and at the same time moving the rotating roll back and forth in a line parallel with its axis. This combination of movements corresponds to, but differs from, movements which are ordinarily given to the knife alone by a skilled operator. However, the machine movements are more positive and certain, and they can be timed and adjusted to give the most satisfactory results. To obtain the desired frictional engagement between the polishing roll and the blades, yielding means such as a spring may be utilized to press the blades onto the roll, and the pressure may be varied, as will be hereinafter pointed out.

The danger of overheating the blades may be positively avoided by subjecting the blades to successive polishing operations and permitting them to cool during the intervals of time between the operations. This also enables the blades to be inspected at frequent intervals so that they may be removed from the machine as soon as the desired polish is obtained. To avoid undue loss of time, several groups of knives may be maintained in the machine, and the knife holder may be actuated to successively and repeatedly bring the several groups into coöperative relation with the polishing roll, thus enabling the roll to act upon one of the groups while the others are cooling and exposed for inspection.

With the foregoing and other objects in view the invention comprises the novel construction, combination and arrangement of parts hereinafter more specifically described and illustrated in the accompanying drawings, wherein is shown the preferred embodiment of the invention; however, it is to be understood that the invention comprehends changes, variations and modifications which come within the scope of the claims hereunto appended.

Figure I is a top or plan view of a knife polishing machine constructed in accordance with the invention, showing the knife carriage as it appears when the blades are separated from the polishing roll.

Fig. II is a front elevation of the machine.

Fig. III is a view of the left side of the machine.

Fig. IV is a rear elevation of the machine.

Fig. V is a view of the right hand side of the machine, showing the knife carriage as it appears when one of the rows of knives is engaged with the polishing roll.

Fig. VI is an enlarged fragmentary view, partly in section, showing the polishing roll and the knife carriage, the knife blades being separated from the roll.

Fig. VII is a fragmentary front elevation showing the means for operating the polishing roll.

Fig. VIII is an enlarged fragmentary detail view of the polishing roll, showing the manner in which the polishing disks are assembled on the shaft.

Fig. IX is a detail view of one of the polishing disks.

Fig. X is an enlarged detail view showing a group of abutments which are carried by the knife carriage, and the guideway in which said abutments travel.

Fig. XI is a plan view of one of the knife holders.

Fig. XII is a rear elevation of the knife holder.

Fig. XIII is a transverse section of the knife holder, taken approximately on the line XIII—XIII, Fig. XI, showing one of the knives clamped in the holder.

Fig. XIV is an enlarged detail view illustrating the manner in which the knives are delivered to the polishing roll.

Fig. XV is a detail view of a portion of the means for adjusting the polishing roll.

The machine illustrated in the drawings comprises a rotary polishing roll, knife holders adjacent to said roll, and operating means whereby power is transmitted to the polishing roll and knife holders. Before describing the operating mechanism and the various minor details, we will describe the polishing roll and knife holders, and briefly point out the manner in which these parts are actuated by the operating means.

The polishing roll A comprises a shaft 1 rotatably mounted in bearings 2, flexible polishing disks 3 mounted on said shaft, a collar 4 fixed to said shaft and a clamping nut 5 screwed onto the shaft. Each polishing disk 3 (Figs. VIII and IX) is preferably made of felt or other suitable flexible material, and each disk is slitted radially to provide free flexible polishing tongues at the periphery of the roll. In assembling the elements of the polishing roll, the flexible disks 3 are arranged in groups as shown in Fig. VIII, and separating collars 6 are interposed between the adjacent groups. After all of these flexible disks and separating collars have been mounted on the shaft, the clamping nut 5 is screwed onto the threaded portion of the shaft and tightened, thereby firmly clamping all of the disks and separator collars between the fixed collar 4 and the nut 5. The polishing elements are thus securely fastened to the shaft.

It is important to observe that the separator collars 6 are smaller in diameter than the flexible disks 3, and that the flexible polishing tongues are free to bend over the adjacent separator collars. A machine constructed as herein shown has been used to polish thousands of knives, and actual experience has shown that the polishing roll just described will very effectively perform its functions when associated with the other elements of the machine. The flexible polishing tongues yield freely to engage the irregular, or uneven, faces of the knife blades, and when the polishing roll is reciprocated longitudinally, as will be hereinafter described, the polishing tongues bend freely while in contact with the knife blades, thereby exposing the blades to various different portions of each polishing tongue. Experience has also shown that the flexible tongues are not rapidly cut away by the knife blades. Owing to the rapid rotation of the polishing roll, centrifugal force tends to retain the polishing tongues in the positions shown by Figs. VIII and IX, but they are soon mashed by contact with the blades so as to form a somewhat irregular yielding polishing surface. Any suitable polishing compound may be applied to the polishing roll.

During each polishing operation a row of knife blades is acted upon by the polishing roll, all of said blades being polished at the same time. To polish each blade from its point to the handle, movement transversely of the roll should be imparted to either the knives or to the roll itself, and we preferably accomplish this result by moving the row of knife blades back and forth across the yielding periphery of the polishing roll. To avoid the production of streaks on the blades, and to uniformly polish the exposed surface of each blade, either the blades or the polishing roll should partake of a movement in a direction approximately parallel with the axis of the roll, and with this in view we preferably reciprocate the rotary polishing roll in a line parallel with its axis. By means of mechanism to be hereinafter described, the polishing roll is therefore rotated on its axis and at the same time reciprocated in a line parallel with its axis. While this peculiar combination of movements is transmitted to the polishing roll, a row of knife blades is moved back and forth on the flexible polishing tongues at the periphery of the roll. The row of blades and the polishing roll are thus manipulated to most effectively obtain the desired polishing action, without the attention of a skilled operator.

The knife holding carriage comprises a rotatable shaft 7 mounted in bearings 8, said shaft having a relatively large square portion 9 which lies between the bearings, and spring arms 10 secured to and extending from said square portion. The spring arms 10 are arranged in pairs, and each of said arms has a projecting abutment 12 adapted to be engaged by a knife holder, as will be presently described. 13 designates attaching screws (Figs. I and VI) pivotally connected to the spring arms at 14, each arm being provided with one of these screws.

Each knife holder comprises a pair of elongated clamping plates 15. and 16 (Figs. VI, XI, XII, and XIII) connected together by means of clamping bolts 17. Yielding material (Figs. VI and XIII) such as felt 18 and rubber 19 is preferably interposed between the clamping plates, and a row of knives K may be interposed between the yielding elements 18 and 19.

In securing the knives to a knife holder, the nuts on the clamping bolts 17 are loosened, and the knife handles are interposed between the yielding elements 18 and 19. The clamping bolts 17 are then tightened to force clamping plates 16 and 17 toward each other, thereby securing the knives to the knife holder. The knife blades extend from the holder, as shown by Figs. I, XIII and XIV. The ends of each knife holder are provided with slots 20 (Fig. XI) for the reception of the pivotally mounted screws 13 (Fig. VI) whereby the knife holder is detachably secured to the knife carriage. After a knife holder has been seated on the free ends of a pair of spring arms 10, the screws 13 are turned on their pivots and inserted into the slots 20 in the ends of the knife holder, and the nuts 13' are tightened to firmly secure the knife holder to the spring arms. The rear edge of each clamping plate 15 is provided with a flange 21 (Figs. XI, XII and XIII) and the clamping plate 19 has a flange 22 which engages said flange 21. When a knife holder is properly mounted on the knife carriage, the flange 21 on the knife holder engages lugs 12 on the spring arms, as shown by Fig. VI.

It will now be understood that the knife carriage may be provided with a succession of knife holders, equally spaced around the axis of the carriage (Fig. VI) and that each knife holder may be provided with a row of knives. The knife carriage is moved toward and away from the polishing roll for the purpose of moving the knife blades across the peripheral face of the roll, and the knife carriage is also turned step by step for the purpose of successively locating the rows of knives in positions adjacent to the polishing roll. To provide for the transmission of an oscillatory movement to the knife carriage, the bearings 8, in which said carriage is mounted, are secured to long arms 23 (Figs. I and IV) and the lower ends of these arms are pivoted at 24. Operating the links 25 (Figs. I, II and VI) are pivotally secured to the upper ends of the long arms 23, and power is transmitted through these links, as will be hereinafter described, for the purpose of moving the knife carriage toward and away from the polishing rolls. When the knife carriage occupies the inoperative position shown by Fig. I, all of the knives are separated from the polishing roll A, and when said carriage is shifted to the position shown by Fig. V, the knife blades of one row move across the polishing face of the roll, and the adjacent ends of the knife handles may engage the polishing roll. Fig. XIV also suggests the manner in which the knife blades are delivered to and move across the polishing roll. By oscillating the knife carriage toward and away from the polishing roll, the knife blades engage with the yielding peripheral face of the roll, and each blade is acted upon from its point to the knife handle.

The polishing roll turns at a relatively high peripheral speed in the direction indicated by the arrow in Fig. XIV, while the knives move back and forth as indicated by the full lines and dotted lines. The knives are yieldingly supported by the spring arms 10, and their pointed ends are primarily extended toward the polishing roll as shown by full lines in Fig. XIV. As the knives advance toward the positions shown by dotted lines, the pointed ends of the blades engage the yielding roll, but inasmuch as said roll is turning at a relatively high speed and in a direction conforming approximately to the direction of movement of the knives, the pointed blades will pass freely onto the yielding polishing surface, without material injury to said surface, and the blades are thereafter withdrawn freely during the return movement of the reciprocating knife carriage. The blades are forced into engagement with the polishing roll by pressure transmitted through the spring arms 10, and the flexible polishing tongues yield in response to this pressure, so as to very effectively act upon the uneven faces of the blades.

After a row of knife blades has been moved back and forth across the polishing roll, the knife carriage is turned one step (one-fourth of a revolution) and the next succeeding row of blades is thereafter delivered to and withdrawn from the polishing roll.

The means for imparting an intermittent step by step rotary movement to the knife carriage comprises four projecting abutments 26 extending from each end of the carriage, there being one abutment for each of the four knife holders. These abutments 26 (Figs. VI and X) are equally spaced about the axis of the knife carriage, and they coöperate with an abutment arm 27 which is pivoted at 28 to a stationary part of the machine. When the knife carriage moves toward and away from the polishing roll, the projecting abutments 26 travel between stationary guide bars 29 and 30 (Figs. VI and X). While the carriage is moving away from the polishing roll, one of the abutments 26 strikes the abutment arm 27, as shown in Fig. X, and at this time the several abutments 26 lie directly above a cam 30' extending from the guide 30. The abutments 26 are then free to move about the axis of the carriage, and as the carriage continues to move away from the polishing roll, one of the abutments 26 is retarded by engaging the pivoted abutment arm 27. As a consequence the carriage turns on its axis while it is moving away from the polishing roll. The free end of the abutment arm 27 is lifted slightly in response to the movement of the abutment 26 occupying the position designated $a$ in Fig. X, while the abutment in the position $b$ rises over the finger 31, and the abutment in the position $c$ eventually moves into the recess 32 below the finger 31. When the knife carriage reaches the extreme position most distant from the polishing roll, the several projecting abutments 26 occupy the positions shown in Fig. VI. The carriage then begins to move toward the polishing roll. The highest abutment 26, moving with the carriage, passes idly under the pivotally mounted abutment 27, and the lowest abutment 26 engages a cam face on the member 30' so as to impart a slight movement to the carriage immediately before the abutments pass between the parallel portions of the guide members 29 and 30. The slight movement just referred to serves to aline the abutments 26 with the guide bars 29 and 30, and as the carriage continues in motion toward the polishing roll these guide bars coöperate with the abutments 26 to prevent accidental rotation of the carriage.

33 designates ratchet wheels (Figs. II, V and VI) fixed to the shaft 7 which forms part of the knife carriage, and 34 designates gravity pawls coöperating with said ratchet wheels. The pawls are pivoted to the long oscillating arms 23 which support the knife carriage. When a row of knives is engaged with the polishing roll, as shown by Figs. V and XIV, the spring arms 10 supporting the knives are placed under tension, and at this time the carriage should be positively prevented from turning on its axis. The projecting abutments 26 and their guide bars 29—30 tend to prevent such movement, and the movement is positively prevented by the pawls 34 which coöperate with the ratchet wheels 33, as shown in Fig. V.

The driving mechanism comprises a motor M (Figs. I and V) and various power transmission elements whereby motion is transmitted from the motor to the polishing roll to the knife carrier. 36 designates a pulley on the motor shaft and 37 is a pulley on the shaft 1, which forms part of the polishing roll. A belt 38 transmits movement from the pulley 36 to the pulley 37, and a rotary movement is thus transmitted from the motor to the polishing roll. The pulley 37 is fixed to the shaft 1, and an elongated pulley 39 is also fixed to said shaft. 40 designates a power transmission shaft arranged parallel with the shaft 1 and provided with a large pulley 41. A belt 42 is mounted on the pulleys 39 and 41 for the purpose of imparting a relatively slow rotary movement to the shaft 40. A small pulley 43 is fixed to the shaft 40, and a pulley 44 is loosely mounted on a shaft 45 at the rear of the machine. 46 designates a belt whereby movement is transmitted from the small pulley 43 to the larger pulley 44, and C designates a clutch device whereby the pulley 44 is normally fixed to the shaft 45. This clutch device includes a shiftable member 47 movable longitudinally of the shaft 45 for the purpose of connecting and disconnecting the pulley 44 to and from said shaft. The shiftable member 47 is operated through the medium of a lever 48 pivotally supported at 49 and provided with a forked end, which coöperates with the member 47 for the purpose of shifting said member 47 on the shaft 45. We do not deem it necessary to show or describe all of the details of this clutch device, its sole function being to control the transmission of movement from the pulley 44 to the shaft 45. When the clutch is released, the polishing roll will be actuated independently of the other elements of the machine, and when power is transmitted through the clutch all of the driving mechanism will be actuated by the motor.

The means for oscillating the long arms 23, which support the knife carriage, comprises the connecting links 25 pivoted to the upper ends of said arms, a rotary shaft 50 at the rear of the machine, a crank 51 fixed to one end of the rotary shaft 50, and a gear wheel 52 fixed to the opposite end of said shaft. One of the links 25 is pivoted to the wrist pin of the rotary crank 51, as shown in Figs. I and V, and the other link 25 is pivoted to a similar wrist pin 53 carried by the gear wheel 52, as shown in Figs. I, III and VI. It will now be understood that a rotary movement of the shaft 50 will result in the transmission of an oscillatory movement to the long arms 23 which support the knife carriage. The knives are thus shifted toward and away from the polishing roll.

The means for transmitting a rotary movement to the shaft 50 comprises a pinion 54 meshing with the large gear wheel 52, said pinion being fixed to a short shaft 55 at the rear of the machine (Figs. III and IV). A relatively large gear wheel 56 is also fixed to the short shaft 55, and this wheel 56 meshes with a pinion 57 on the shaft 45. The rotary movement of the shaft 45 therefore results in the transmission of a relatively slow rotary movement to the shaft 50, whereby the links 25 are driven.

We have previously stated that the polishing roll not only revolves on its axis but is also reciprocated in a line parallel with said axis. To provide for the reciprocating movement, the shaft 1 is free to move longitudinally in its bearings 2 (Fig. I), and the pulleys associated directly with shaft 1 are wide enough to permit such movement without becoming disengaged from their belts. The means for reciprocating the polishing roll comprises a collar 58 (Figs. I, II and IV) loosely mounted on the shaft 1, said collar being arranged between a pair of collars 59 which are fixed to the shaft 1. An upright shifter lever 60 (Fig. IV) is forked at its upper end to receive the last collar 58. This forked end is secured to the collar 58 for the purpose of moving said collar to the shaft 1 in a direction parallel with the axis of the shaft. The shifter lever 60 is pivoted at 61 (Fig. IV). 62 designates a link connecting the lever 60 to an arm 63 fixed to the oscillatory shaft 64. An operating arm 65, fixed to the shaft 64, is connected by means of a flexible coupling 66 to the lower end of a long upright link 67. The upper end of this long link is pivoted to the wrist pin of a rotary crank 68 fixed to one end of the rotary shaft 45. The short crank 68 is shown in Figs. IV and V. Through the medium of the mechanism just described, movement is transmitted from the rotating shaft 45 to the shifter lever 60 whereby the polishing roll is reciprocated in a line parallel with its axis.

When the machine is in operation the polishing roll revolves on its axis, and at the same time moves back and forth in a line parallel with said axis. While this peculiar movement is being imparted to the polishing roll, the knife carrier moves toward and away from the polishing surface, thereby delivering the blades to said polishing surface and moving them back and forth transversely of the polishing roll. As previously pointed out, the knife carrier also turns one-fourth of a revolution immediately after each polishing operation, thereby moving one row of knives away from the polishing roll and at the same time moving another row toward said roll. The rows of knives are successively engaged with the polishing roll, and they are subjected to repeated polishing operations until the desired results are obtained. Immediately after each brief polishing operation, the row of knives passing from the polishing roll is shifted toward the front of the machine where they may be easily inspected by the operator, and the knives are permitted to cool before being again engaged with the polishing roll. The intermittent polishing operations not only enable the knives to be inspected at frequent intervals, but they also enable the desired polish to be obtained without in any way impairing the temper of the knife blades, the metal being permitted to cool during the intervals between the repeated polishing operations.

After the desired polish has been obtained on one of the faces of each knife blade, the positions of the knives are changed for the purpose of subjecting the opposite faces to the polishing operations. The positions of the knives may be changed by removing the knife holders from the machine and then turning each knife in the holder. To turn the knives in this manner it is necessary to loosen the clamping bolts 17 (Figs. XI and XIII) so as to loosen the knives between the clamping plates 16 and 18. However, the same result may be obtained without loosening the knives in their holders. Each end of the knife holder is slotted at 20 (Fig. XI) to receive the attaching bolts 13 (Fig. VI) on the knife carriage, and if the nuts 13′ are loosened to permit the removal of a knife holder, said holder may be inverted and replaced with the unpolished faces of the knives exposed to the polishing roll.

The knife carriage is actuated through the medium of the shaft 50 at the rear of the machine (Fig. I) and the clutch actuating lever 48 may be shifted at any time to discontinue the transmission of movement to the knife carriage. This enables the knife holders to be attached to and removed from the machine without stopping the electric motor M. It will also be observed that the driving pulleys and the gear wheels are so proportioned that the polishing roll will be driven at a relatively high peripheral speed while it is reciprocating at a much lower speed. The knife carriage also moves at a low speed relative to the peripheral speed of the polishing roll.

The knife blades are yieldingly pressed into engagement with the polishing roll, and this pressure should be adjusted to obtain the most satisfactory results. The yielding pressure is obtained by permitting the spring arms 10 (Fig. XIV) to bend when the blades are forced onto the polishing roll, and the adjustment may be obtained by raising and lowering the polishing roll.

The bearings 2, in which the shaft 1 is mounted, are fixed to arms 69 (Figs. I, III and VI) pivotally supported at 70, each of said arms 69 having a pocket 71 for the reception of a nut 72 (Figs. VI and XV). The pocket is non-circular in cross section, as shown in Fig. XV, and it prevents the nut from turning on the vertical screw 73. Each arm 69 is provided with one of the adjusting devices 71, 72, 73, and each of the screws 73 is mounted in bearings, as shown in Fig. VI. To operate both of the screws 73 at the same time, each of said screws is provided at its lower end with a bevel gear wheel 74 (Fig. VII) and these wheels 74 mesh with similar wheels 75 fixed to an operating shaft 76. It will be apparent that the operating shaft may be turned to impart rotary movement to the screws 73, thereby raising or lowering the polishing roll so as to vary the pressure at the knife blades.

A lower guard plate 77 (Figs. III and V) may be secured to the front of the machine, and an upper guard plate 78 may be pivoted to said lower plate. The upper guard plate 78 may occupy the elevated position shown in Fig. V to serve as a guard or shield in front of the knife carriage, and said guard plate 78 may be dropped to the position shown in Fig. III to expose the knife carriage. 79 designates a latch device (Fig. V) for securing the guard plate 78 in its elevated position.

80 designates shields (Fig. VII) arranged at opposite ends of the polishing roll, and 81 is a pan mounted below said roll to receive the polishing compound which eventually passes from the roll.

We claim:

1. In a knife polishing machine, a rotary polishing roll, a yielding knife holder whereby the knives are yieldingly held with their blades engaging the periphery of said rotary polishing roll, means whereby one of said parts is moved toward and away from the other to engage different portions of each knife blade with said polishing roll, and adjustable means for varying the frictional contact between said polishing roll and the knife blades, said adjustable means including bearings wherein said roll is rotatably mounted, adjusting screws for moving said bearings and operating means whereby said screws are adjusted simultaneously.

2. In a polishing machine, a polishing roll, a carriage provided with a holder for the articles to be polished, means for shifting said carriage toward and away from said polishing roll to move the articles transversely of said roll, and means whereby said carriage is turned while the articles are disengaged from the polishing roll.

3. In a knife polishing machine, a polishing roll, a carriage provided with knife holders each adapted to hold a row of knives with their blades extended, means for turning said carriage to successively locate the rows of knives adjacent said rotary polishing roll, and means for shifting said carriage to move the extended blades across the polishing roll.

4. In a knife polishing machine, a polishing roll, a carriage provided with knife holders each adapted to hold a row of knives with their blades extended, means for turning said carriage to successively locate the rows of knives adjacent said rotary polishing roll, means for shifting said carriage to move the extended blades across the polishing roll, and means for preventing said carriage from turning while the blades engage the polishing roll.

5. In a knife polishing machine, a polishing roll having a yielding peripheral polishing face, a carriage provided with a succession of knife holders whereby rows of knives are held with their blades extended from the carriage, means for repeatedly shifting said carriage toward and away from said polishing roll so as to move the extended rows of blades across said yielding peripheral polishing face, and rotating means cooperating with the shifting means to turn the carriage step by step, thereby successively locating the rows of blades in positions to be acted upon by said polishing face.

6. In a knife polishing machine wherein rows of knives are successively and repeatedly exposed to the polishing element, a rotary carriage provided with a succession of holders for the rows of knives, a rotary polishing roll, means for repeatedly shifting said rotary carriage toward and away from said polishing roll so as to move the rows of knives across said polishing roll; and intermittent rotating means cooperating with the shifting means to turn said carriage step by step, thereby moving the succession of knife holders to deliver the different rows of blades to said polishing roll.

7. In a knife polishing machine, a rotary polishing roll, an oscillatory knife carriage, a succession of knife holders carried by said carriage, each of said knife holders being adapted to hold a row of knives with their blades engaging said polishing roll, means for oscillating said carriage from an inoperative position wherein all of the rows of knives are separated from said polishing roll to an operative position wherein one of the rows of knives is engaged with said polishing roll, and rotating means for imparting an intermittent step by step rotary movement to said carriage so as to successively locate the several rows of knives in positions to be acted upon by said polishing roll, said rotating means being effective when said carriage occupies an inoperative position.

8. In a polishing machine, a rotary polishing member, a rotary carriage for the articles to be polished, means for moving said rotary carriage toward and away from said rotary polishing member so as to polish the articles carried by said carriage, and means whereby said rotary carriage is turned step by step, the last mentioned means including projections carried by said carriage and an abutment arranged in the path of said projections so as to be successively engaged by the several projections.

9. In a knife polishing machine, a rotary polishing member, a rotary knife carriage, a succession of knife holders secured to said carriage, each of said knife holders being adapted to hold a row of knives with their blades extended toward said polishing roll, means for repeatedly moving said carriage toward and away from said polishing member, and means for imparting an intermittent step by step rotary movement to said carriage so as to successively locate the several rows of knives in positions to be acted upon by the polishing member, the last mentioned means including a succession of abutments on said rotary carriage, there being one of said abutments for each knife holder and said abutments being equally spaced about the axis of said rotary carriage, and another abutment coöperating successively with the aforesaid abutments to impart the rotary movement to the carriage.

10. In a knife polishing machine, a rotary polishing roll, an oscillatory knife carriage, a succession of knife holders carried by said carriage, each of said knife holders being adapted to hold a row of knives with their blades engaging said polishing roll, means for oscillating said carriage from an inoperative position wherein all of the rows of knives are separated from said polishing roll to an operative position wherein one of the rows of knives is engaged with said polishing roll, and rotating means for imparting an intermittent step by step rotary movement to said carriage so as to successively locate the several rows of knives in positions to be acted upon by said polishing roll, said rotating means being effective when said carriage occupies an inoperative position, and a ratchet and pawl preventing retrograde rotary movement of said carriage.

11. In a knife polishing machine, a rotary polishing roll, an oscillatory knife carriage comprising a rotary shaft and knife holders secured thereto, each of said knife holders being adapted to hold a row of knives with their blades extended toward said polishing roll, means for oscillating said carriage from an inoperative position wherein all of the knives are separated from said polishing roll to an operative position wherein one of the rows of knives is engaged with said polishing roll, and means for imparting an intermittent step by step rotary movement to said carriage so as to successively and repeatedly locate the several rows of knives in positions to be acted upon by said polishing roll, the last mentioned means including projections extending from said rotary shaft, there being one projection for each knife holder, an abutment arranged in the path of said projections so as to be successively engaged by the several projections while the knife carriage is moving away from said polishing roll, thereby causing said carriage to turn one step after each polishing operation, a pivotal support for said abutment allowing the abutment to yield when engaged by a projection moving toward said polishing roll, a guide for said projections having a cam face adapted to be engaged by the projections so as to coöperate therewith in turning the carriage and a ratchet and pawl preventing retrograde movement of said rotary shaft when the carriage occupies its operative position.

12. In a knife polishing machine, a rotary polishing roll, a knife holder comprising a pair of clamping members between which a row of knives is clamped with the blades extended toward said polishing roll, a carriage to which said knife holder is detachably secured, and means for moving said carriage toward and away from said polishing roll so as to simultaneously move all of the extended blades back and forth on the peripheral face of said polishing roll.

13. In a knife polishing machine, a polishing roll, a knife holder wherein a row of knives is held with the blades extended toward said polishing roll, said knife holder comprising a pair of clamping members between which the knife handles are mounted and screws whereby said clamping members are forced toward each other, a support for said knife holder, screws whereby said knife holder is detachably secured to said support, and operating means whereby all of said blades are simultaneously engaged with said polishing roll.

14. In a knife polishing machine, a rotary polishing roll, a knife holder wherein a row of knives is held with the blades extended toward said polishing roll, a support to which said knife holder is reversibly secured to enable both sides of the row of blades to engage said polishing roll, and operating means whereby all of said blades are simultaneously engaged with said polishing roll.

In testimony that we claim the foregoing we hereunto affix our signatures.

FRANK RAMSTETTER.
WILLIAM J. BRITT.